United States Patent [19]

McElroy

[11] 4,192,909
[45] Mar. 11, 1980

[54] MOTORCYCLE BATTERY INDICATOR

[76] Inventor: Kenneth W. McElroy, 611 Bradley Dr., Bloomington, Ill. 61701

[21] Appl. No.: 916,142

[22] Filed: Jun. 16, 1978

[51] Int. Cl.² .......................................... H01M 10/48
[52] U.S. Cl. ...................................................... 429/91
[58] Field of Search ..................................... 429/90, 91

[56] References Cited

U.S. PATENT DOCUMENTS

| 1,699,633 | 1/1929 | Sears | 429/91 |
| 2,548,558 | 4/1951 | Raney | 429/91 |
| 3,977,908 | 8/1976 | Kitai | 429/91 |

FOREIGN PATENT DOCUMENTS 302784 12/1928 United Kingdom ...................... 429/91

Primary Examiner—Donald L. Walton
Attorney, Agent, or Firm—Fitch, Even & Tabin

[57] ABSTRACT

A motorcycle battery having a transparent casing is provided with a ball in each cell. Each ball has a predetermined specific gravity such that the charge level and the electrolyte level of each cell may be easily determined.

8 Claims, 2 Drawing Figures

MOTORCYCLE BATTERY INDICATOR

The present invention relates to batteries and more particularly to motorcycle storage batteries having a transparent case.

Motor vehicles such as motorcyles typically have a generator powered by the vehicle's engine to supply electricity for powering the lights, horn, etc. However, a storage battery is typically used to power a starting motor which starts the engine, in addition to powering the lights when running the engine is not desired.

The state of charge or "charge level" of a battery is a measure of the capability of the battery to deliver electrical current. The charge level of a battery drops as the battery discharges, i.e., as the battery supplies electricity to power various loads. Should the charge level drop too low, the battery will be incapable of delivering the necessary current for the particular application. For example, the battery will not be able to start the engine if the charge level is too low. Thus, it is important to know the charge level of the battery.

Storage batteries are, of course, capable of being recharged to a "full charge" level after having been discharged to a "low charge" level. Storage batteries are typically recharged in a motorcycle by the generator driven by the engine. A low charge level of the battery can result from overuse of the battery while the generator is not in use or from a faulty electrical system. If it is known that the battery has a low charge level then the problem can be corrected before the battery becomes so discharged that it can no longer start the engine or that the engine will not run at all.

Storage batteries also typically have an electrolyte stored within. Should the electrolyte level become too low, the batttery can malfunction and lose its charge. Thus it is also important to know the electrolyte level of the battery.

An object of the present invention is to provide an improved and economical system for easily determining whether or not a motorcycle battery of the like is in good working order. In particular, the system of the present invention provides an indication of whether the battery has a low charge level as well as a highly noticeable or visible indication of the electrolyte level without the use of additional indicators.

These and other advantages will become more apparent from the following detailed description, and accompanying drawing of which:

A preferred embodiment of the present invention provides a storage battery for motorcycles and the like comprising a plurality of storage cells, each of which contains an electrolyte having a specific gravity dependent upon the charge level of the associated cell. Each of the cells also has a solid, visible, and movable acid resistant mass, with a specific gravity greater than the specific gravity of the electrolyte when the cell is fully discharged, for floating in the electrolyte so that the mass floats toward the bottom of the cell as the cell charge level or electrolyte level drops. Each of the cells also has a transparent wall portion so that the location of the mass within the cell may be visually monitored or inspected so that the charge level and electrolyte level of the cell may be easily determined.

Figure 1:
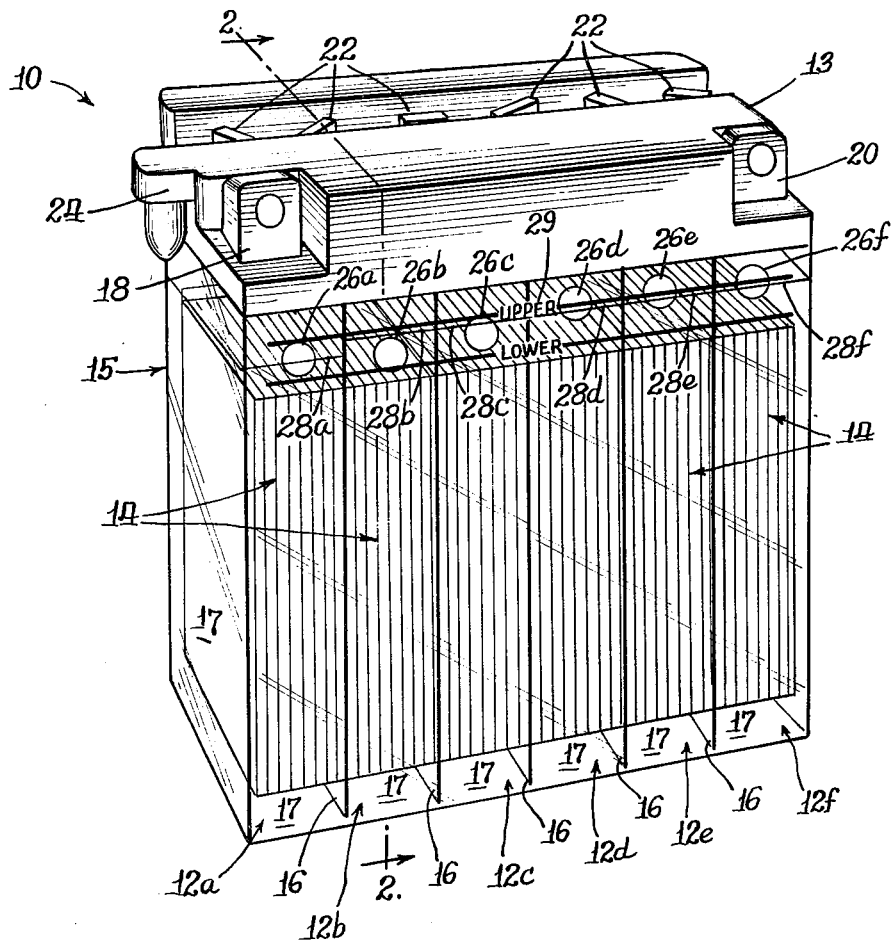
FIG. 1 is a perspective view of a battery embodying the present invention.

The illustrated embodiment of the present invention will be described in connection with a lead storage battery shown in FIGS. 1 and 2. A battery such as the one shown generally at 10 is, of course, a device for the direct transformation of chemical energy into electrical energy. A battery usually has several identical units or cells $12a$–$12f$ connected in series. In each cell are a plurality of positive and negative electrodes or plates 14 which are immersed in a fluid known as electrolyte.

As is well known, storage batteries have cells that are reversible to a high degree. In other words, the chemical condition of the electrodes may be reversed to their original condition by reversing the current flow. The current flows in a particular direction during discharge and the battery may be charged by causing current to flow in the opposite direction.

The active materials of a lead storage battery are typically lead peroxide, $PbO_2$, on the positive plates and sponge lead, Pb, on the negative plates. The plates 14 are immersed in an electrolyte which is usually sulfuric acid and water ($H_2SO_4$ and $H_2O$). On discharge the active material on both sets of plates 14 of each cell 12 is converted into lead sulfate. The amount of lead sulfate formed on the plates and the amount of acid lost from the electrolyte are proportional to the ampere-hour discharge.

In the illustrated battery, each cell has a casing comprised of a top portion 13 which is attached to a lower casing 15. The lower casing is comprised of a plurality of clear plastic inner walls 16 and outer walls 17 which contain the cell's electrolyte within each cell but render the inside of each cell visible to outside observation. The inner walls 16 result in each cell having its own separate reservoir of electrolyte.

Each cell has one or more grids (not shown for clarity) for the positive and negative plates, each of which supports the active material and transmits current from the plate terminals (also not shown) to all parts of the active material. The plate terminals are connected in series to the battery's positive teminal 18 and the negative terminal 20 which are supported by the casing's top portion 13. A filler cap 22 is provided for each cell which may be removed from the top portion 13 to replenish the electrolyte in the cells. A vent tube 24 is provided to vent excess gas.

As noted before, the electrolyte for lead storage batteries is dilute sulfuric acid (sulfuric acid and water). During discharge, the specific gravity or density of the electrolyte falls or drops due to the combination of the sulfuric acid in the electrolyte with the active material of the plates to form lead sulfate. During the charging of the battery this process is reversed and the specific gravity rises.

In accordance with the illustrated embodiment, there are provided a plurality of masses $26a$–$26f$ located between the plates 14 and the top portion 13,for floating in the electrolyte of the cells having a specific gravity or density such that the level at which each mass floats indicates the specific gravity and hence the charge for each cell. In the illustrated battery, each mass is spherically shaped like a ball with one ball in each cell. The specific gravity of each ball $26a$–$26f$ is less than the specific gravity of the electrolyte when the battery is at full charge so that the ball may float at the top or surface of the electrolyte near the top portion 13 when that particular cell is fully charged as shown for the balls $26d$, $e$, and $f$ within the cells 12, $d$, $e$ and $f$, respectively.

Furthermore in the preferred embodiment each ball has a specific gravity greater than the specific gravity of the electrolyte when the battery is fully discharged. Thus a ball will begin to sink or float toward the bottom when the specific gravity of the ball is greater than the specific gravity of the electrolyte of the cell in which the ball is contained. This happens as the cell reaches a particular state of discharge as shown for the cells 12b and c with the cell 12b at a state of greater discharge (i.e. lower state of charge) than the cell 12c since the ball 26b is lower than the ball 26c (assuming the ball 26c has the same or greater specific gravity than the ball 26b).

The electrolyte of the lead storage battery 10 of the illustrated embodiment has a specific gravity of approximately 1.125 when the cell is at full charge and approximately 1.115 at a state of full discharge. The exact specific gravity, however, is a function of several variables including temperature. Furthermore, the specific gravity can drop (as low as 1.122, for example) without the battery being dangerously discharged or the electrical system being faulty. For these reasons the preferred specific gravity for the balls 26a–26f is 1.122, which allows the specific gravity of the electrolyte to fall from 1.125 to 1.122, or about 20% of the charge level, before the balls begin to drop. This allows some flexibility so that the user is not needlessly warned of a drop in specific gravity of the electrolyte and hence the charge level. A 20% tolerance or variation in charge level without dropping the balls should generally be satisfactory for the presently described purposes, although other tolerances may be used. The minimum specific gravity for the balls is preferably 1.119.

The levels of the electrolyte of the cells 12a–f are shown at 28a–f, respectively. The levels 28b–f are shown to be near an "UPPER" mark 29. As seen in FIG. 1, the balls 12d, e and f are floating at the top of the electrolyte level of their respective cells which indicates that the various specific gravities of the electrolyte of the cells 12d, e and f, respectively, are at or greater than 1.222. Hence these cells are at or near full charge.

The ball 26c in the cell 12c is shown floating below the surface 28c of the electrolyte. This indicates that the specific gravity of the electrolyte of the cell 12c is below 1.122 and that the cell is discharged to a charge state lower than normal, i.e., it has a low charge. A low charge usually results form overuse of the battery without the generator operating or from a faulty electrical system.

Figure 2:
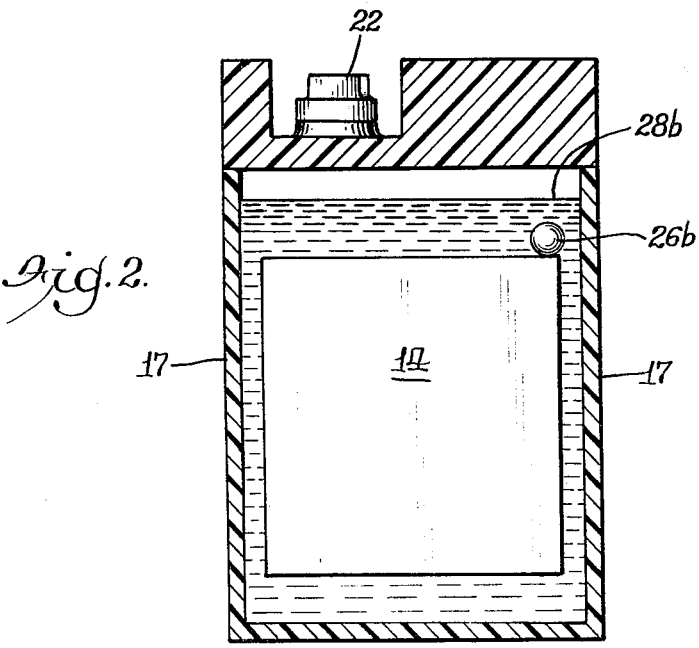
FIG. 2 is a sectional view along the line 2—2 of the battery of FIG. 1.

The ball 26b indicates an even lower charge in the cell 12b as best seen in FIG. 2. The ball 26b is shown resting on the plates 14 of the cell which indicates that the specific gravity of the cell has fallen to a large extent as a result of the charge level also falling to a large extent.

The ball 26a is also shown floating at a level lower than the balls 26d–f. However, a close examination of the cell 12a reveals that the electrolyte level has fallen to the level shown at 28a which is below the "UPPER" mark 29. The electrolyte level of a battery having a transparent wall is often difficult to ascertain since the electrolyte is also transparent. With the ball 26a floating at the surface, the electrolyte level is easily noticed. An electrolyte level substantially below the level indicated by the "UPPER" mark 29 as seen in the cell 12a is considered too low and should be restored to a level near the "UPPER" mark as seen for cells 12b–f.

Thus, a quick glance at a battery employing the features of the present invention would reveal whether the battery is in good working order or not. If all the balls are floating at the top, then the battery is fine. On the other hand, if one or more balls has dropped to a lower level, then a closer examination will determine whether a particular ball has dropped due to the charge level having dropped or due to the electrolyte level having dropped.

In the illustrated embodiment the masses are shaped as balls and have a diameter of 6mm. The balls may be constructed of a acid resistant plastic having the desired specific gravity of approximately 1.122 and sufficient resistivity to the battery acid such that the acid has no deleterious effect on the balls. Additionally the plastic should be opaque to enhance visibility. However, it is understood that other shapes, sizes and compositions may be used to practice the present invention in its broadest aspects. Accordingly, the scope of the invention should not be limited by the particular embodiment and specific construction herein described, but should be defined only by the appended claims, and equivalents thereof.

Various features are set forth in the following claims.

What is claimed is:

1. A storage battery for motorcycles comprising a plurality of storage cells, each of said cells containing an electrolyte having a specific gravity dependent upon the charge level of the associated cell, each of said cells having a solid, visible and movable mass, with a specific gravity greater than the specific gravity of said electrolyte when said cell is fully discharged, for floating in said electrolyte so that the mass floats toward the bottom of the cell as either the cell charge level or electrolyte level drops; said battery having a lower casing and a top portion attached to said lower casing and each of said cells having a plurality of plates; said lower casing having a transparent wall portion so that the location of said mass within the cell may be visually inspected; said plurality of masses being physically confined only by said top portion, said lower casing transparent portion and said plates so that each movable mass feeely moves within a cell so that as the charge level or electrolyte level of a cell drops, the mass associated with the cell floats down toward the plates of that cell; each of said masses being of a sufficient size to rest on said plates without falling therebetween.

2. The system of claim 1 wherein said mass has a specific gravity less than the specific gravity of said electrolyte when said cell is fully charged.

3. The system of claim 2 wherein said mass has a specific gravity such that the charge level may drop approximately 20% before the mass begins to float toward the bottom of the cell.

4. The apparatus of claim 1 wherein said mass has a specific gravity within the range of approximately 1.122–1.125.

5. The apparatus of claim 1 wherein said mass has a specific gravity greater than 1.119.

6. The apparatus of claim 1 wherein each of said masses is shaped similar to a ball.

7. The apparatus of claim 6 wherein each mass has a diameter of approximately 6 millimeters.

8. The apparatus of claim 1 wherein said lower casing has a plurality of spaced transparent partition walls located between adjacent cells which further define and isolate said cells so that an electrolyte and a mass of an associated cell are confined to that cell.

* * * * *